(12) United States Patent
Spannheimer et al.

(10) Patent No.: US 9,487,087 B2
(45) Date of Patent: Nov. 8, 2016

(54) ENERGY-OPTIMIZED ACCELERATION CONTROL FOR MOTOR VEHICLES

(75) Inventors: Helmut Spannheimer, Neukeferloh (DE); Dirk Wisselmann, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 830 days.

(21) Appl. No.: 13/195,651

(22) Filed: Aug. 1, 2011

(65) Prior Publication Data

US 2011/0288736 A1 Nov. 24, 2011

Related U.S. Application Data

(63) Continuation of application No. PCT/EP2010/000403, filed on Jan. 23, 2010.

(30) Foreign Application Priority Data

Feb. 3, 2009 (DE) .......................... 10 2009 007 278

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *G06G 7/70* | (2006.01) |
| *B60K 26/02* | (2006.01) |
| *B60W 50/08* | (2012.01) |

(52) U.S. Cl.
CPC .......... *B60K 26/021* (2013.01); *B60W 50/082* (2013.01); *B60W 2540/103* (2013.01); *B60W 2720/106* (2013.01); *Y02T 10/52* (2013.01)

(58) Field of Classification Search
USPC .......................................... 701/70, 101, 104
See application file for complete search history.

(56) References Cited

U.S. PATENT DOCUMENTS

| 4,458,651 A | 7/1984 | Inoue et al. |
| 4,510,906 A * | 4/1985 | Klatt ............................. 123/396 |
| 4,516,063 A * | 5/1985 | Kaye et al. ................... 318/685 |

(Continued)

FOREIGN PATENT DOCUMENTS

| CN | 101214795 A | 7/2008 |
| DE | 31 22 268 A1 | 12/1982 |

(Continued)

OTHER PUBLICATIONS

Chinese Office Action dated Aug. 21, 2013, with English translation (Ten (10) pages).

(Continued)

*Primary Examiner* — Yonel Beaulieu
*Assistant Examiner* — Lail Kleinman
(74) *Attorney, Agent, or Firm* — Crowell & Moring LLP

(57) ABSTRACT

An energy-optimized acceleration control is provided for a motor vehicle having an internal-combustion engine and/or an electric drive motor, a transmission unit and an accelerator element to be operated by the driver for accelerating the motor vehicle. In the course of the restoring force, when the accelerator element is operated, an inflection point with an increased restoring force is provided. The acceleration control is set up for operating the motor vehicle in two different operating modes, wherein during operation of the accelerator element leading to a reaching of the inflection point, the acceleration control changes into an energy-optimized acceleration mode.

5 Claims, 1 Drawing Sheet

(56) References Cited

U.S. PATENT DOCUMENTS

| | | |
|---|---|---|
| 5,884,208 A | 3/1999 | Byon |
| 2007/0276582 A1* | 11/2007 | Coughlin ................ 701/123 |
| 2008/0140294 A1* | 6/2008 | Park ..................... 701/93 |
| 2009/0281701 A1* | 11/2009 | Kargman ............ B60K 26/021 |
| | | 701/70 |
| 2010/0139444 A1* | 6/2010 | Park ..................... 74/513 |
| 2010/0250085 A1* | 9/2010 | Sugano et al. ............ 701/70 |
| 2010/0274459 A1* | 10/2010 | Suzaki et al. ............ 701/93 |
| 2010/0299037 A1* | 11/2010 | Sakaguchi et al. ........ 701/70 |
| 2011/0087414 A1* | 4/2011 | Shiomi et al. ............ 701/70 |
| 2011/0098898 A1* | 4/2011 | Stahlin et al. ............ 701/70 |
| 2011/0098900 A1* | 4/2011 | Shiomi et al. ............ 701/70 |
| 2011/0202235 A1* | 8/2011 | Oikawa ................... 701/36 |
| 2011/0260557 A1* | 10/2011 | Noh et al. ............ 310/12.04 |
| 2011/0270479 A1* | 11/2011 | Rauner et al. ............ 701/22 |

FOREIGN PATENT DOCUMENTS

| | | |
|---|---|---|
| DE | 197 43 958 A1 | 4/1999 |
| DE | 10 2007 032 722 A1 | 2/2008 |
| DE | 10 2007 035 424 A1 | 1/2009 |
| EP | 1 297 987 A1 | 4/2003 |
| GB | 2 119 130 A | 11/1983 |
| WO | WO 03/074311 A1 | 9/2003 |

OTHER PUBLICATIONS

Innovations-Report, Oct. 6, 2004, Active Accelerator, URL: http://www.innovations-report.de/html/berichte/materialwissenschaften/bericht-34474.html. (Two (2) pages).

International Search Report dated Jun. 18, 2010 including English-language translation (Four (4) pages).

German Search Report dated Oct. 10, 2009 including partial English-language translation (Nine (9) pages).

* cited by examiner

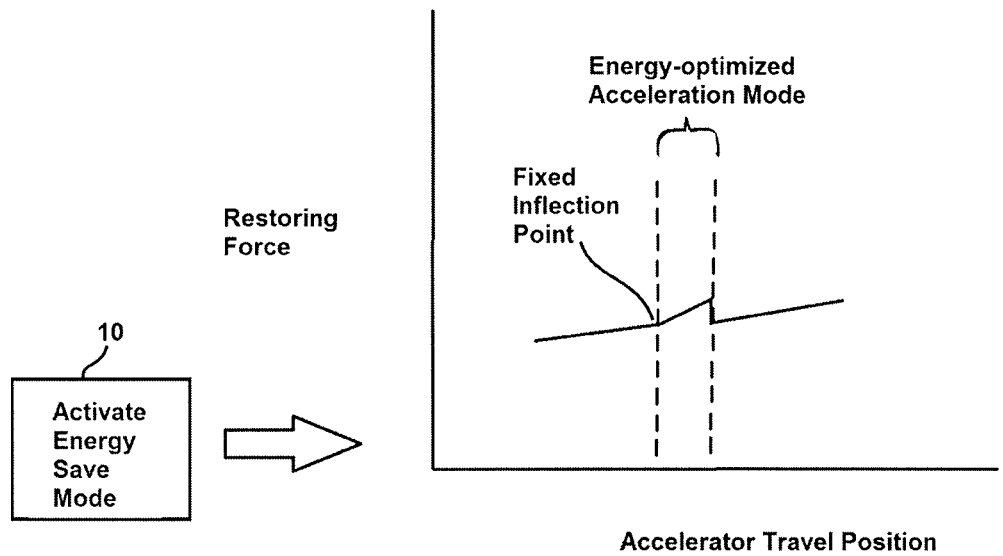

ENERGY-OPTIMIZED ACCELERATION CONTROL FOR MOTOR VEHICLES

CROSS-REFERENCE TO RELATED APPLICATIONS

This application is a continuation of PCT International Application No. PCT/EP2010/000403, filed Jan. 23, 2010, which claims priority under 35 U.S.C. §119 from German Patent Application No. DE 10 2009 007 278.0, filed Feb. 3, 2009, the entire disclosures of which are herein expressly incorporated by reference.

BACKGROUND AND SUMMARY OF THE INVENTION

The invention relates to an energy-optimized acceleration control for a motor vehicle having an internal-combustion engine and/or an electric drive motor, a transmission unit and/or an accelerator element to be operated by the driver for accelerating the motor vehicle.

In order to be able to accelerate in an energy-optimized manner, in the case of passenger cars at low rotational speeds, the driver has to depress the accelerator pedal by approximately ¾ of the total accelerator pedal travel. Different approaches exist for making it easier for the driver to find the correct accelerator pedal position for an energy-optimized acceleration, which generally allows for driving in the energy-efficient power range.

Thus, a system is known that has an active accelerator pedal. In this case, the energy-optimized acceleration is continuously haptically indicated to the driver by way of the active accelerator pedal by a controlled pressure point in the course of the restoring force. However, an active accelerator pedal requires high construction and control expenditures, which leads to high development and manufacturing costs.

Simpler and more cost-effective systems generate only a fixed pressure point in the course of the restoring force. Thus, DE 31 22 268 A1 discloses a fuel-saving device in the form of a spring element to be retrofitted under the accelerator pedal. As a result, (when the spring element is reached) a pressure point is generated in the course of the restoring force, so that the driver is prevented from accidentally depressing the accelerator still further and thereby causing an increased fuel consumption.

From the type-forming EP 1 297 987 A1, a timing gear control is known for a vehicle having a manual transmission, in which case a fixed pressure point or inflection point is also provided in the course of the restoring forces of the accelerator pedal. The restoring force rises in an intensified manner when this pressure point or inflection point is reached. In the case of a position of the accelerator pedal between the inoperative position and the inflection point, only a first operating mode of the valve gear control can occur, a second operating mode occurring behind the inflection point. The first operating mode may be an engine operation with a stoichiometric air-fuel ratio, in which case the throttle valve is at least partially closed. The partial closing of the throttle valve causes a limitation of the engine power, whereby a particularly economical operation of the motor vehicle is ensured. Such a method may have the result that, because of the power reduction in the first operating mode, the driver may feel that the decision is not left up to him, because this first economical operating mode will already be present when the driver does not depress the accelerator pedal or depresses it only slightly.

It is now an object of the invention to provide a cost-effective and easily implementable energy-optimized acceleration control for a motor vehicle, based on which the driver will only be driving in an energy-optimized or energy-efficient mode if he in fact desires to do so.

This and other objects are achieved by an energy-optimized acceleration control method and apparatus according to the invention for a motor vehicle having an internal-combustion engine and/or an electric drive motor, a transmission unit and an accelerator element to be operated by the driver for accelerating the motor vehicle (in which case a restoring force acts upon the accelerator element when the accelerator element is operated). The driver is assisted with respect to a more energy-efficient acceleration operation by a simple constructive further development of the accelerator element. For this purpose, a fixed inflection point (similar to the kick-down inflection point in the case of vehicles with automatic transmissions) is provided in the course of the restoring force when the accelerator element is operated. This fixed inflection point can be felt by the driver as a pressure point with an increased resistance when the accelerator element is operated correspondingly. The inflection point can, for example, be noticed by the fact that the restoring force increases erratically or by the fact that at least the gradient of the restoring forces clearly changes at this inflection point. The inflection point (or the increased resistance existing at the inflection point) can be generated, for example, by way of an appropriately designed auxiliary spring. The acceleration control is suitable for vehicles with an internal-combustion engine as well as for vehicles having a hybrid drive unit consisting of an internal-combustion engine and an electric drive unit, or vehicles having only an electric drive unit (so-called electric vehicles).

The invention is now characterized in that, when the accelerator element is operated until the inflection point has been reached, the acceleration control is changed such that an energy-optimized or energy-efficient accelerating of the motor vehicle becomes possible. For this purpose, a change into an energy-optimized acceleration mode takes place when the inflection point is reached. Since the driver's desire for an "energy-optimized acceleration can be clearly detected by way of the inflection point, it becomes possible to optimally condition the vehicle starting from the reaching of the inflection point with respect to an energy-optimized acceleration.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a schematic and graphical representation of an embodiment according to the present invention.

DETAILED DESCRIPTION OF THE DRAWINGS

Referring to FIG. 1, an exemplary graph illustrating the course of the restoring force with respect to an accelerator element travel position. In the exemplary graph, the restoring force increases gradually until reaching a fixed inflection point, at which the gradient of the restoring force clearly changes in a manner noticeable to the driver of the vehicle. The energy optimized acceleration mode takes place when the inflection point is reached. Since the driver's desire for an energy-optimized acceleration can be clearly detected by way of the inflection point, it becomes possible to optimally condition the vehicle with respect to an energy-optimized acceleration upon reaching the inflection point.

In the course of the restoring force, the inflection point should ideally be arranged or be present where an energy-efficient acceleration of the vehicle is possible anyhow; thus, approximately at three fourths of the section of the entire course of the restoring force or at three fourths of the path of the accelerator element.

Within the scope of the energy-optimized acceleration mode, for reaching an energy-optimized acceleration, an adaptation of the parameterization is advantageously carried out such that the motor vehicle or the drive unit (internal-combustion engine and/or an electric drive motor) accelerates with an energy-optimized load, thus in an energy-efficient manner. For this purpose, for example, an adaptation of the parameterization of a characteristic engine diagram stored in the motor vehicle, a generator control, and/or the stored characteristic shifting curves can be carried out.

As shown in the FIGURE, in an advantageous further development, the energy-optimized acceleration mode activated when the inflection point has been reached will then be left again or be deactivated when the driver changes the position of the accelerator element such that the accelerator element will leave the inflection point or an area defined around the inflection point. When the driver exceeds, for example, the resistance caused by the inflection point, he can (again) retrieve an increased engine power and accelerate the vehicle by means of the increased power.

In order to not unnecessarily limit the driver's vehicle handling, the inflection point, whose reaching causes a change into the energy-optimized acceleration mode, should be present or be generated only if desired by the driver. Thus, with an increased resistance, the inflection point may be active only (and be changed into the energy-optimized acceleration mode) if an energy-saving mode is active, which can be activated by the driver, for example, by means of a key or pushbutton 10. If the driver does not want any change into the energy-optimized acceleration mode, he can actively prevent this by operating or not operating—depending on the further development of the system—the operating element 10 provided for this purpose.

For reasons of completeness, it should be mentioned that the acceleration control according to the invention is provided for many different motor vehicles (passenger car, truck, motorcycle) with many different types of drive units (internal-combustion engines, hybrid drives, electric drives) and of transmission units (automatic transmissions, manual transmissions). In addition to the above-defined inflection point, —the change into the energy—optimized acceleration mode taking place when this inflection point is reached—, a kick-down inflection point according to the state of the art may be provided which, in the course of the restoring forces, is at least not arranged in front of the above-defined inflection point. During a change into the energy-optimized acceleration mode, an adaptation of the parameterization of the characteristic shifting curves can be carried out. Likewise, however, the invention can be used in motor vehicles having manual transmissions in connection with a corresponding shift point indication and only one inflection point in the course of the restoring force.

As a result of the energy-optimized acceleration control according to the invention, the driver will experience optimal assistance when driving energy-efficiently. For accelerating the accelerator element, the driver can simply operate or depress the accelerator element to the inflection point and can thereby optimally accelerate, because the stepping on the accelerator element further developed as the accelerator pedal to the defined inflection point can be implemented very easily, and the position can then also be maintained very well. The additional costs are minimal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An acceleration control method for a motor vehicle comprising at least one of an internal-combustion engine and an electric motor, and a transmission unit and an accelerator element operable by the driver for accelerating the motor vehicle, the method comprising the acts of:
   providing an accelerator element operable with an inflection point at which an increased restoring force occurs;
   providing an acceleration control by which the motor vehicle is operable in at least two different operating modes, including an energy-optimized acceleration mode during which adaptation of a parameterization of at least one of a characteristic engine diagram, a generator control, and characteristic shifting curves for the motor vehicle reduces an amount of fuel consumption that occurs during an acceleration of the motor vehicle as compared to an amount of fuel consumption that would have occurred during the acceleration without said adaptation; and
   during operation of the accelerator element, changing the acceleration control into the energy-optimized acceleration mode upon reaching the inflection point.

2. The acceleration control method according to claim 1, further comprising the act of:
   maintaining the energy-optimized acceleration mode active until the inflection point or an area defined around the inflection point is left in the course of the restoring force as a result of a corresponding operation of the accelerator element.

3. The acceleration control method according to claim 1, further comprising the act of:
   changing into the energy-optimized acceleration mode upon reaching the inflection point during operation of the accelerator element only if an energy-saving mode of operation is activated by a driver of the motor vehicle.

4. The acceleration control method according to claim 1, wherein the inflection point is arranged approximately at three fourths of a section of an entire course of the restoring force.

5. The acceleration control method according to claim 1, wherein the motor vehicle comprises an automatic transmission unit, the method further comprising the act of:
   providing a kick-down inflection point in addition to the inflection point for changing into the energy-optimized acceleration mode, said kick-down inflection point not being arranged in front of the inflection point for changing into the energy-optimized acceleration mode.

* * * * *